June 17, 1969     U. CRAMER ET AL     3,450,417
DEVICE FOR THE HITCHING OF A LOADING PLATFORM
Filed Feb. 9, 1967

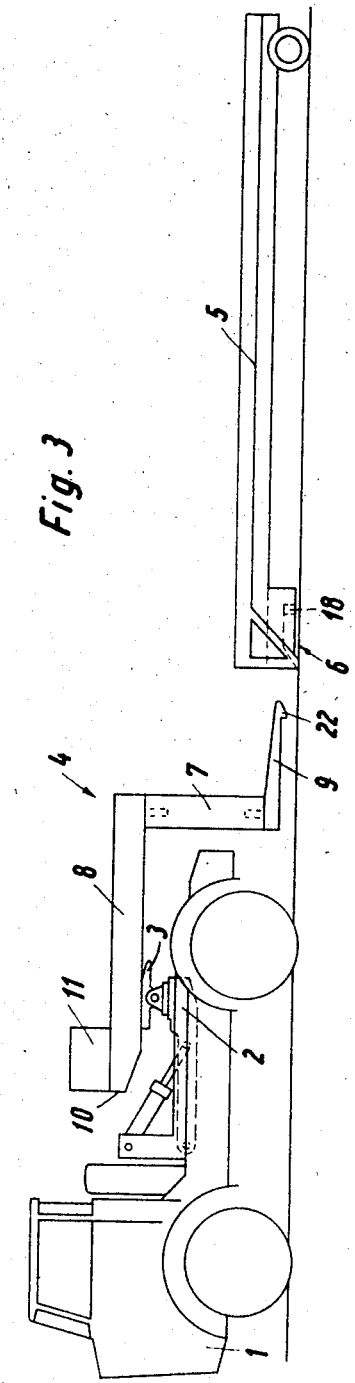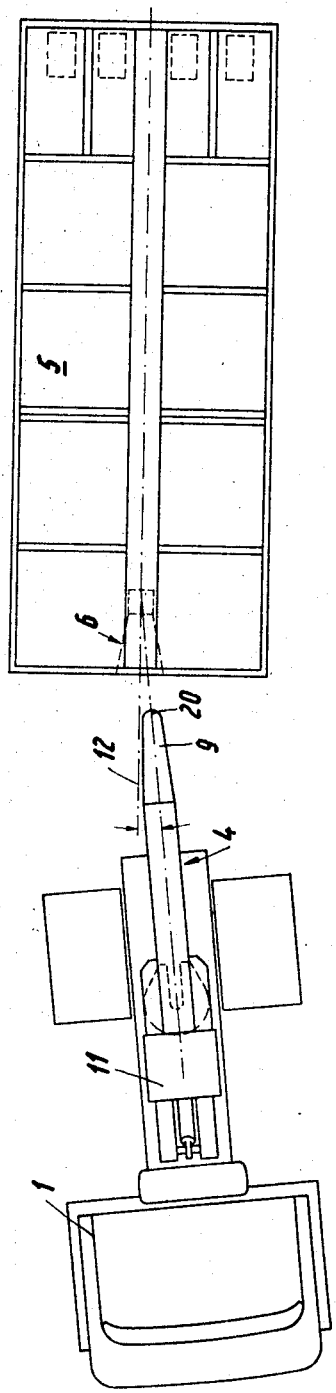

Inventor:

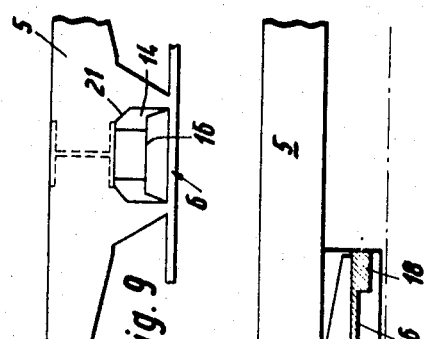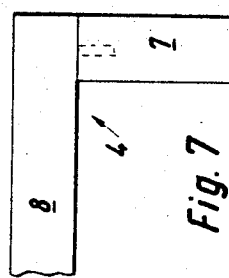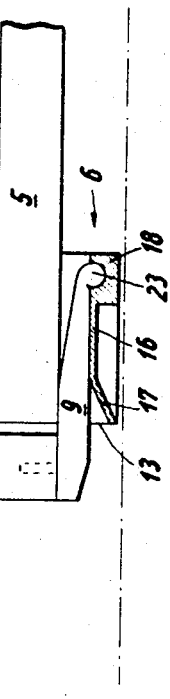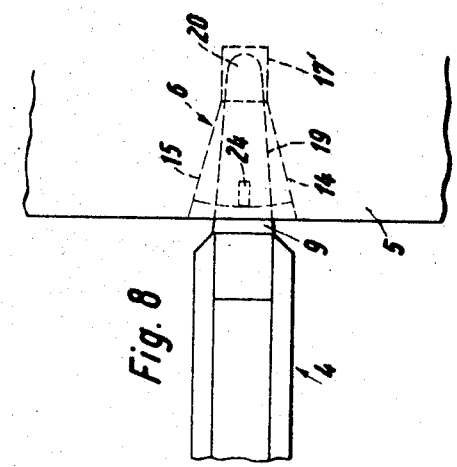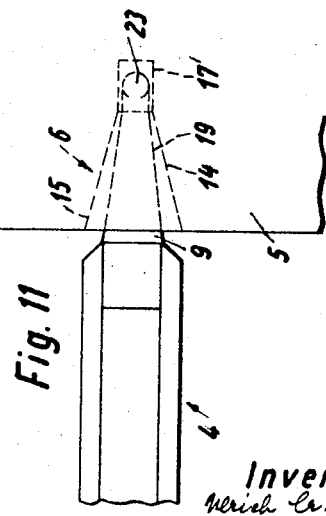

United States Patent Office 3,450,417
Patented June 17, 1969

3,450,417
DEVICE FOR THE HITCHING OF A LOADING PLATFORM
Ulrich Cramer, Stuttgart-Stammheim, Manfred Jung, Munchingen, and Karl Weinmann, Konigshafen, Germany, assignors to Martin Fiala KG., Korntal, Wurttemberg, Germany, a corporation of Germany
Filed Feb. 9, 1967, Ser. No. 614,986
Claims priority, application Germany, Aug. 13, 1966,
M 70,559
Int. Cl. B62d 53/06; B60d 1/00
U.S. Cl. 280—425                                      24 Claims

ABSTRACT OF THE DISCLOSURE

A device for the hitching of a loading platform to a vehicle which includes a lifting device, the latter having at least one arm protruding past the end of the vehicle and associated with and inserted in a receptacle. The receptacle is provided on at least one end of the loading platform, receiving one of the arms.

---

The present invention concerns a device for the hitching of a loading platform, the latter being provided with wheels at least at one end, to a vehicle that has a lifting device which has at least one arm that is protruding past the vehicle, whereby the arm is associated to a receptacle provided on at least one end of the loading platform.

It is known to provide supporting frames on loading platforms, in order to hitch loading platforms to vehicles provided with pivot coupling gear. These supporting frames designated as swannecks are connected solidly to the loading platforms. Therefore, it is necessary to provide a supporting frame for each loading platform, consequently such loading platforms become unnecessarily heavy and also more expensive and in addition, they become bulkier, since the supporting frames require a comparatively large space for the parking of the unhitched loading platforms. Therefore, it has already been suggested to manufacture the approximately horizontally to the front protruding part of the supporting frame, designated as the swanneck, tiltable. This would, no doubt, result in the saving of space, but the already bulky construction of a swanneck would become still more massive and, therefore, also more expensive.

Particularly in the utilization of the loading platforms in the so-called roll in-roll off traffic, in which the loading platforms are driven into ships with their load, then shipped with the cargo and are driven off the ships again at their destination, is it necessary to utilize loading platforms that are space-saving and of light construction and can be articulated quickly to the available transport vehicles.

It is one object of the present invention to provide a device for the hitching of loading platforms of the above mentioned kind, that is constructed in such a way that the loading platforms can be hitched to the supporting frame of the semitrailer tractor quickly, securely, without special guidance of the supporting frames, by the driver of the semitrailer tractor alone and in a normal driving operation.

It is another object of the present invention to provide a device for hitching of loading platforms, wherein the arm is extended in the longitudinal direction of the vehicle and the receptacle for the upper and the lower side of the arm is associated with and inserted in it and forms at least one shifted contact each, and namely on that side located opposite to the shifted contact, in the longitudinal direction of the arm. Such a construction makes a very simple design of the receptacle possible and, at the same time, provides a very secure mounting of the arm in the receptacle, due to the jamming of the arm which occurs during the lifting process of the loading platform. In addition, no sensitive parts nor narrow tolerances are necessary in this construction, so that it is sturdy in its operation and economical in its manufacture.

If the receptacle is formed in the shape of a box, then it can be constructed wider and higher at its front end, at the entrance end of the arm, than at its rearmost end, so that the entering process is made easier and with deeper penetration of the arm into the receptacle an automatic centering of the arm takes place. This centering of the arm can be improved by providing sheet metal guides in the upper area of the side plates close to their front end, the guides being inclined towards the top and are converging towards one another, through which, during the lofting process of the loading platform, it and the supporting arm are guided into the proper position for hitching to one another. Instead of the above described guides, the upper parts of the side walls themselves can be shaped in the form of a roof, inclined towards one another. Thereby, it is possible to hitch the loading platform to the vehicle that is carrying the supporting frame in such positions where the center of rotation of the hitching device lays outside of the longitudinal center line of the receptacle, since the aligning truing up relative to each other of the supporting arm and of the receptacle occurs automatically during the lifting process of the lifting frame.

It is still another object of the present invention to provide a device for hitching of loading platforms, wherein a particularly simple and space-saving construction of the receptacle results, if the loading platform is provided with a central longitudinal girder and the receptacle is formed by one of the ends of the central girder. Naturally, it is also possible to provide receptacles on both ends of the loading platform, so that, through a corresponding provision of running wheels on both ends of the loading platform, semitrailer tractors can be hitched selectively to the one or to the other end of the platform, whereby the loading platforms become even more versatile in their use.

If the vehicle is provided with a vertically adjustable hitching device and a supporting frame is arranged on it, the supporting frame having at least one arm that interacts with a receptacle provided on the loading platform, then the supporting frame can be shaped in the form of a Z with advantage, whereby in this case it has a leg that is projecting downwards and the shank that is running away from the vehicle forms the arm that is inserted into the receptacle. This construction of the supporting frame makes it posible to bridge the difference in elevation between the hitching device and the receptacle on the loading platform in a simple manner. The arm of the loading platform can, in its width as well as in its height, converge towards its free end and has suitably a curved end which corresponds in its diameter approximately to the width in the rearmost area of the receptacle, so that a centering of the free end of the arm results also. Since the sides of the arm insert tangentially into the curved free end, a very smooth arm results which inserts very well into the receptacle. For additional security of the arm in the receptacle a stud can be provided on the upper or lower side or on both sides of the arm, which interlocks with corresponding projections or recesses in the receptacle.

If the leg of the Z-shaped supporting frame is articulated pivotable opposite the articulated arm on the hitching device or if the arm that is inserted into the receptacle is articulated pivotable opposite the legs, an even greater range results in which the supporting frame is hitchable to the loading platform.

In order to prevent undesired swinging motions of the parts of the supporting frame which are swivably interconnected, while in operation, they can be held in their central position by resetting members, for instance, by springs.

With these and other objects in view, which will become apparent in the following detailed description, the present invention which is described by example only will be clearly understood in connection with the accompanying drawings, in which:

FIG. 3 is a side elevation of a semitrailer tractor with a vertically adjustable hitching device and a thereon saddled supporting frame in a suitable position for hitching onto the loading platform;

FIG. 4 is a top plan view onto a semitrailer tractor, as set forth in FIGS. 1 to 3, and a loading plaform in which the center of rotation of the pivot coupling gear lays outside of the longitudinal center line of the loading platform;

FIG. 7 is a fragmentary schematic elevation, partly in section, of a supporting frame and the receptacle associated therewith;

FIG. 8 is a top plan view of the device disclosed in FIG. 7;

FIG. 9 is an end view of the showing in FIG. 7 in the direction of the arrow X;

FIG. 10 is a fragmentary schematic elevation, partly in section, of a supporting frame and of the associated receptacle provided on the loading platform; and FIG. 11 is a top plan view of the device disclosed in FIG. 10.

Figure 1:
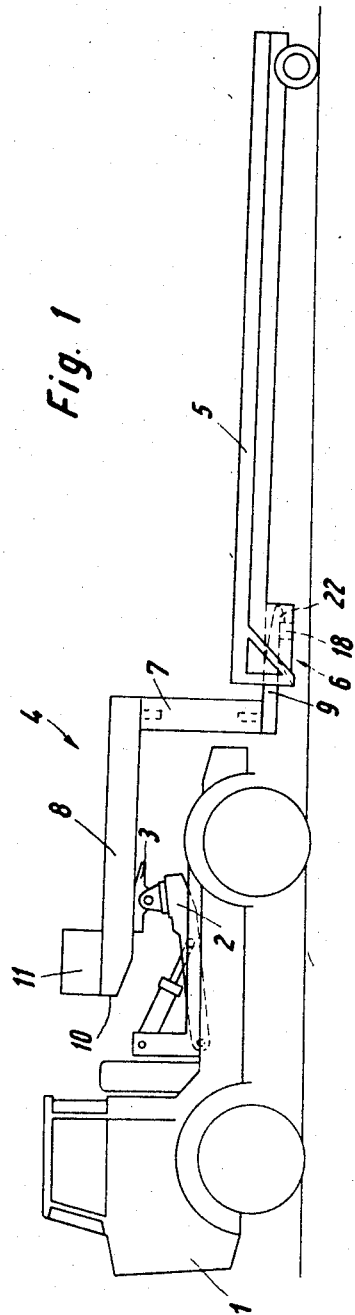
FIGURE 1 is a side elevation of a semitrailer tractor with a vertically adjustable hitching device and a loading platform hitched to the tractor by means of a supporting frame.
Figure 2:
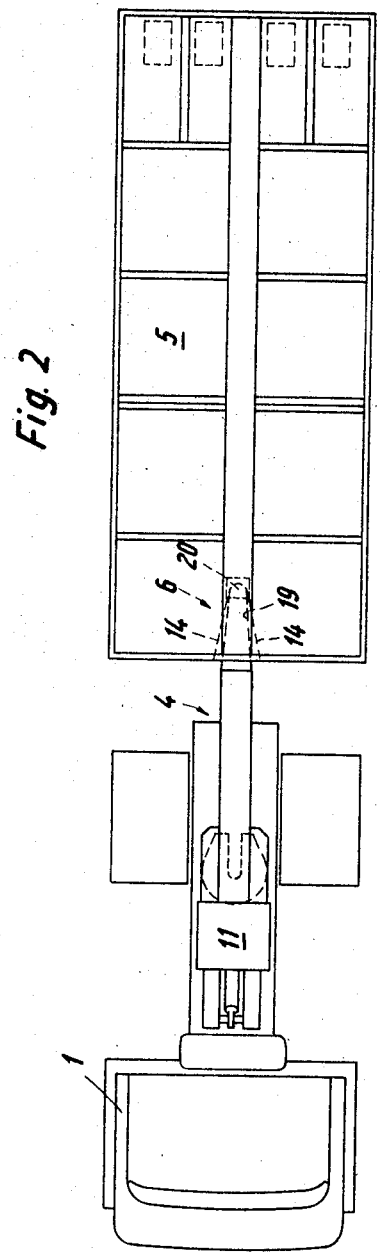
FIG. 2 is a top plan view of the device disclosed in FIG. 1.

Referring now to the drawings, and to the respective figures in particular, examples of different embodiments are disclosed, wherein a semitrailer tractor 1 serves as hauling and lifting vehicle, the tractor being provided with a vertically adjustable pivot coupling gear 2 that will not be elucidated any further here, since it is not the object of the present invention. A supporting frame 4 is arranged on the pivotally mounted disc 3 of the pivot coupling gear 2. The semitrailer tractor 1 can be hitched to a loading platform 5 by means of the supporting frame 4. To accomplish this connection the loading platform 5 is provided with a receptacle 6.

In the respective embodiments provided by example only, the supporting frame 4 is shaped in the form of a Z and is equipped with a leg 7 and two arms 8 and 9. The arm 8 is secured on the pivot coupling gear 2 at a distance from its free end 10 and carries a counterweight 11 within the range of its free end 10. The counterweight 11 is proportioned, so that the supporting frame 4 is held in a suitably suspended position for the performing of the hitching process, when it is not hitched to the loading platform 5. The lower arm 9 of the supporting frame 4 extends in its suspended position in an approximately horizontal direction, so that it can only be inserted into the receptacle 6 on the loading platform 5 through the moving of the semitrailer tractor 1. Since, and this will be described in detail below, through the construction of the receptacle 6 according to the present invention, the hitching of the loading platform 5 can also be carried out if the supporting arm 9 is not laying aligned with the longitudinal center line 12 of the receptacle 6, the hitching of the loading platform 5 to the supporting frame 4 can be carried out quickly and securely without requiring particular precision.

The construction of the receptacle 6 and special construction features of the arm 9, conditioned by this construction of the receptacle 6, shall be discussed with the aid of FIGS. 7 to 11. As these figures show, the receptacle 6, secured on the loading frame 5, is of approximately box-type design and widens towards its entrance end in the shape of a funnel. For this purpose, the approximately vertically extended walls 14, which are preferably secured to a longitudinal girder of the loading platform 5, are arranged diverging towards the entrance mouth 13 in their frontmost range 15 and a cross plate 16, which connects the side walls 14 in their lower reaches, has, for this purpose, a downward bent segment 17 in its front part, the latter facing the entrance mouth 13. In the rear area segments 17' of the side walls 14 run parallel to one another with a space between them that corresponds approximately to the width of the front end of the coupling arm 9 and thereby they form a guide for the inserted arm 9. The cross plate 16 runs approximately parallel to the top edge of the side walls 14 in its rearmost range and has a reinforcement 18 at its rearmost end, which forms the rearmost and the lower contact area for the arm 9. In the top plan view, the lateral walls 19 of the arm 9 are converging towards the free end of the arm 9, and namely, with a smaller angle of inclination than the side walls 14 of the receptacle 6 and convert at the rearmost end of the arm 9 tangentially into the curved end part 20 of the arm 9. The curved design of the end part 20 of the arm 9 makes it possible also, if it is in a certain sloping position, to insert it into the part formed by the parallel segments 17' of the side walls 14. The supporting frame 4 is shown in such an angular position in the representation according to FIG. 4, that the center of rotation of the supporting frame 4 lies outside of the longitudinal center line 12 of the receptacle 6.

The aligned truing up to one another of the mechanism 6 and therewith the loading platform 5 and the supporting frame 4 can be positively achieved in the construction according to the present invention during the lifting process of the loading platform 5 by the supporting frame 4 thereby, that the side walls 14, as presented in FIG. 9, are provided with roof-shaped converging sections 21 in their frontmost upper range. Since the arm 9 comes into contact with one of these converging sections 21 in a laterally offset position to the receptacle 6 during the lifting of the loading platform 5, transverse forces result that are quite sufficient to swivel this in relation to the arm 9, if the loading platform is lifted, so that an aligned position to one another of the loading platform 5 and the supporting frame 4 results. It is natural that the side walls 14 can also be constructed in vertical parallelism to their upper anchorage and can be provided with roof-shaped, towards one another converging sheet metal guides close to the upper end of the side walls 14, which version is not shown in the drawings.

In order to prevent with certainty a jumping off of the loading platform 5 from the supporting frame 4 during travel over rough terrain, it is advantageous to provide at least one nose projection on the supporting arm 9 that interlocks with a corresponding counterholder. A nose projection 22 is shown in the FIGS. 1 and 3, which is constructed as a downwardly projecting extension at the rearmost end of the arm 9 and interlocks with a girder 18 which serves as the rear termination of the cross plate 16 when the arm 9 is inserted. A ball-shaped projection 23 is provided in the embodiment disclosed in FIGS. 10 and 11 for which a correspondingly shaped pan in the cross girder 18 serves as a receptacle. In the FIGS. 7 and 8, the nose projection is provided on the upper side of the arm 9 and is formed by an extension 24 which interlocks with a recess provided behind the front contact area which is, for instance, formed by the frontmost section 25 of the girder associated with the receptacle 6, when the arm 9 is inserted.

Figure 5:
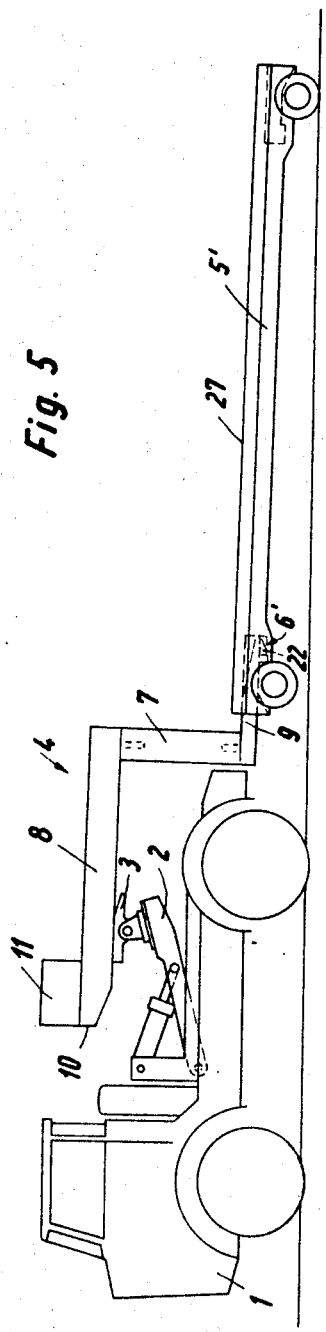
FIG. 5 is a complete arrangement corresponding to the preceding figures, but with a loading platform that is provided with receptacles and running wheels on both ends.
Figure 6:
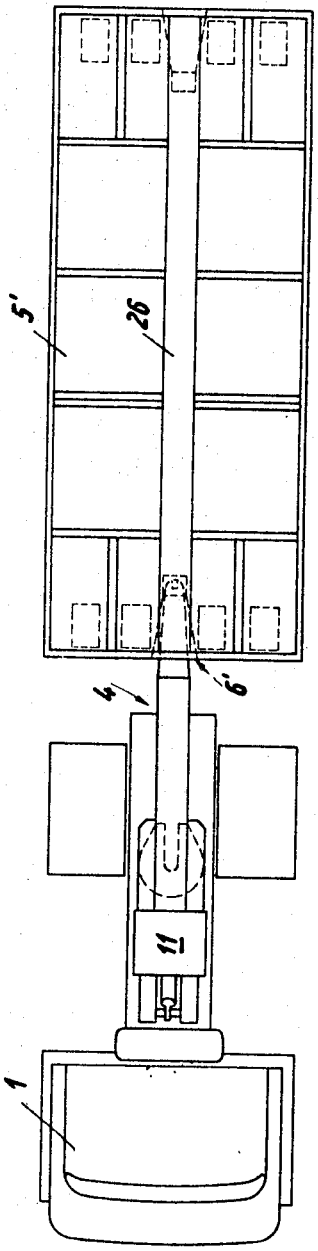
FIG. 6 is a top plan view of the arrangement set forth in FIG. 5.

Referring now again to the drawings, and in particular to FIGS. 5 and 6, a loading platform 5' is disclosed, that is provided with running wheels on both ends and the loading platform 5' is provided with a receptacle 6' on both ends. The loading platform 5' has a central longitudinal girder 26. Since there remains little clearance between the underside of the loading platform 27 and the ground in such an arrangement of the running wheels and the desired loading height of the loading platforms, it is advantageous in this type of design to construct one end of the central girder 26 as a receptacle 6'.

The construction of the receptacle 6' corresponds to the construction of the previously described receptacle 6. The maneuverability of the loading platform 5' can be improved still further by an arrangement of running wheels and receptacles 6', on both ends of the loading platform. In order to simplify the hitching process between the loading platform 5' and the semitrailer tractor 1 still further and to make the hitching possible in case where the difference of the angular positions of the longitudinal center line of the receptacles 6 and that of the supporting frame 9 is still greater, and this is not represented in the drawings, it can be advantageous to construct the leg 7 pivotably around an approximately vertical axle relative to the arm 8 where an additional joint results on the loading platform. Instead of making the leg 7 pivotable relative to the arm 8, the arm 9 can also be made pivotable relative to the leg 7. In order to achieve a rigid articulation of the loading platform 5' to the semitrailer tractor 1 during travelling operation, corresponding resetting devices such as springs for instance, must be provided, which hold the possible pivotable leg 7 or the arm 9 in its central position.

Since no contact of the supporting frame 4 on one of the lateral edges of the loading platform 5 is necessary in this type of construction, but rather between the supporting frame 4, that is to say, between the arm 9 and the loading platform 5, a space can be provided which is determined solely by strength considerations, the coupling device according to the present invention is still fully operable even when carrying loads that jut out past the loading platform 5.

We claim:

1. In combination with a pulling vehicle and a movable loading platform, a device for the hitching of the movable loading platform to the pulling vehicle, comprising
   a swan neck operatively secured to the pulling vehicle for lifting the loading platform,
   a receptacle provided at least on one end of said loading platform and defining an entrance mouth,
   said swan neck having a plurality of arms,
   one of said arms being received in said receptacle and having width smaller than that of the receptacle,
   the latter having vertically disposed side plates, a front and a rear support for said one of said arms, and locking means engaging said receptacle effective in the pulling direction of said one of said arms,
   said receptacle having an engagement face for said front support,
   the width of said engagement face being smaller than the total width of said entrance mouth,
   lateral inclined guide faces directed upwardly towards said engagement face, and
   the rear support of said one of said arms being disposed rearwardly of said guide faces.
2. The device, as set forth in claim 1, wherein said guide faces are formed by guide metal sheets.
3. The device, as set forth in claim 1, wherein said receptacle is disposed at one end of said loading platform, and
   said entrance mouth is arranged at the center of said one end.
4. The device, as set forth in claim 1, wherein said loading platform has a central longitudinal girder, and
   said entrance mouth is defined by one end of said central longitudinal girder.
5. The device, as set forth in claim 1, wherein said receptacle is widened towards its front end in downward direction.
6. The device, as set forth in claim 1 wherein said receptacle has a rear extension for the rear support of the end of said one of said arms of said swan neck.
7. The device, as set forth in claim 6, wherein said rear extension of said receptacle has lateral guide plates for the end of said one of said arms of said swan neck.
8. The device, as set forth in claim 6, wherein said rear extension of said receptacle has a lower engagement face for the end of said one of said arms of said swan neck.
9. The device, as set forth in claim 1, wherein said side plates converge towards the rear over one part of their length and run parallel to one another in the range of their rear end.
10. The device, as set forth in claim 1, wherein said receptacle has two side plates anchored on said loading platform,
    a cross plate which connects said side plates in their lower ranges,
    said cross plate runs inclined upwards in its front range and nearly parallel to the loading surface of said loading platform in its rear range.
11. The device, as set forth in claim 10, wherein the rearmost transverse edge of said cross plate is reinforced and forms the contact for the lower side of said arm.
12. The device, as set forth in claim 10, wherein the contact for the lower side of said arm is formed by a strut arranged between said side plates.
13. The device, as set forth in claim 1, wherein said vehicle includes a supporting frame,
    the latter is constructed in the form of a Z to define two horizontal arms and a substantially downward projecting leg therebetween,
    a shank running away from said vehicle forms one of said arms that is insertable into said receptacle, and said leg of said supporting frame is swivable in relation to said arm resting on said pivot coupling gear.
14. The device, as set forth in claim 1, wherein said vehicle includes a supporting frame,
    the latter is constructed in the form of a Z to define two horizontal arms and a substantially downward projecting leg therebetween,
    a shank running away from said vehicle forms one of said arms that is insertable into said receptacle, and said arm associated with said receptacle is swivable in relation to said leg of said supporting frame.
15. The device, as set forth in claim 1, wherein said vehicle includes a supporting frame,
    the latter is constructed in the form of a Z to define two horizontal arms and a substantially downward projecting leg therebetween,
    a shank running away from said vehicle forms one of said arms that is insertable into said receptacle,
    one of said arms is swivable in relation to said leg, and said leg and said arms are selectively guided resettingly in relation to their central position.
16. The device, as set forth in claim 15, which includes spring operatively connected with said leg and said arm, respectively, and provided for the resetting into the central position.
17. The device, as set forth in claim 1, wherein said vehicle includes a supporting frame,
    the latter is constructed in the form of a Z to define two horizontal arms and a substantially downward projecting leg therebetween, a shank running away from said vehicle forms one of said arms that is insertable into said receptable, said arm of said supporting frame, connected to said pivot coupling gear, projects past said pivot coupling gear with its free end, and a counter weight is provided within the range of the free end of said arm.

18. The device, as set forth in claim 17, wherein said supporting frame is held floating in a position by said counterweight in which said arm, associated with said receptacle, extends in substantially horizontal direction.

19. The device, as set forth in claim 1, wherein said arm converges in its width towards its free end and has a curved end, and in a top plan view, the sides of said arm connect tangentially to said curved end of said arm.

20. The device, as set forth in claim 19, wherein the angle enclosed by the sides of said arm is smaller than the angle enclosed by the converging parts of said side plates.

21. The device, as set forth in claim 20, wherein the free end of said arm is rounded off semi-circularly and the diameter of the rounding circle corresponds approximately to the distance between the parallel parts of said side plates.

22. The device, as set forth in claim 1, wherein at least one nose projection is provided selectively on the upper and on the lower side of said arm, and said arm being anchored in said receptacle, when said arm is inserted in said receptacle.

23. The device, as set forth in claim 22, wherein said nose projection interlocks with one part of the receptacle, when said arm is inserted in said receptacle.

24. The device, as set forth in claim 22, wherein said nose projection is ball-shaped.

References Cited

UNITED STATES PATENTS

| | | |
|---|---|---|
| 2,389,211 | 11/1945 | Pointer. |
| 2,663,574 | 11/1953 | Martin. |
| 2,963,302 | 12/1960 | Ronk. |
| 3,207,338 | 9/1965 | Felburn _____ 214—131 |

FOREIGN PATENTS 99,597   11/1961   Netherlands.

LEO FRIAGLIA, Primary Examiner.

U.S. Cl. X.R.

214—506